US012572337B2

(12) United States Patent  
Liu

(10) Patent No.: US 12,572,337 B2  
(45) Date of Patent: Mar. 10, 2026

(54) METHOD AND APPARATUS OF CONTROL EDITING, DEVICE, AND READABLE STORAGE MEDIUM

(71) Applicant: Beijing Zitiao Network Technology Co., Ltd., Beijing (CN)

(72) Inventor: Jian Liu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 159 days.

(21) Appl. No.: 18/572,554

(22) PCT Filed: Jun. 9, 2022

(86) PCT No.: PCT/CN2022/097980  
§ 371 (c)(1),  
(2) Date: Dec. 20, 2023

(87) PCT Pub. No.: WO2023/279914  
PCT Pub. Date: Jan. 12, 2023

(65) Prior Publication Data  
US 2024/0289099 A1 Aug. 29, 2024

(30) Foreign Application Priority Data  
Jul. 9, 2021 (CN) .......................... 202110793586.1

(51) Int. Cl.  
*G06F 8/38* (2018.01)

(52) U.S. Cl.  
CPC ...................................... *G06F 8/38* (2013.01)

(58) Field of Classification Search  
CPC ....................................................... G06F 8/38  
See application file for complete search history.

(56) References Cited

U.S. PATENT DOCUMENTS

2005/0102632 A1 5/2005 Klinger et al.  
2010/0211893 A1* 8/2010 Fanning ................... G06F 8/38  
715/760

(Continued)

FOREIGN PATENT DOCUMENTS

CN 101178650 A 5/2008  
CN 104360866 A 2/2015

(Continued)

OTHER PUBLICATIONS

International Search Report and Written Opinion for International Application No. PCT/CN2022/097980, mailed Aug. 25, 2022, 15 Pages.

(Continued)

*Primary Examiner* — Daniel Samwel

(57) ABSTRACT

The present disclosure provides a control editing method and apparatus, a device, a readable storage medium, and a product. The method includes: in a first display area, displaying a screenshot interface of current display content of the target application software to be analyzed, and displaying at least one triggerable control in the screenshot interface; in response to a triggering on a target triggerable control in the screenshot interface, controlling the display interface to display a control editing interface corresponding to the target triggerable control, the control editing interface including an editable attribute corresponding to the target triggerable control; in response to editing data inputted in the control editing interface, generating the editing instruction according to the editing data; and according to the editing instruction, performing an editing on the attribute of the target triggerable control.

20 Claims, 6 Drawing Sheets

(56) References Cited

U.S. PATENT DOCUMENTS

| | | | | |
|---|---|---|---|---|
| 2016/0062575 A1 | 3/2016 | Yamamichi | | |
| 2016/0283204 A1* | 9/2016 | Zaiwei | | G06F 3/033 |
| 2018/0239622 A1 | 8/2018 | Gebauer | | |
| 2018/0349107 A1* | 12/2018 | Lundeen | | G06F 8/38 |
| 2019/0310868 A1* | 10/2019 | Vaindiner | | G06V 30/416 |
| 2021/0081180 A1* | 3/2021 | Hsu | | G06F 8/38 |

FOREIGN PATENT DOCUMENTS

| | | |
|---|---|---|
| CN | 107102798 A | 8/2017 |
| CN | 109542431 A | 3/2019 |
| CN | 109871205 A | 6/2019 |
| CN | 110286896 A | 9/2019 |
| CN | 110795085 A | 2/2020 |
| CN | 111552620 A | 8/2020 |
| CN | 111752669 A | 10/2020 |
| CN | 112269527 A | 1/2021 |
| CN | 112394908 A | 2/2021 |
| CN | 113377366 A | 9/2021 |

OTHER PUBLICATIONS

"Design and implementation of bridge safety monitoring system based on Android platform", China Academic Journal Electronic Publishing House, Mar. 2017, 60 pages.

Chen J., "Save the properties presented by the control as an image in the WPF program", May 15, 2018, 8 pages (2 pages of English translation and 6 pages of original document).

Collins et al., "Live coding in laptop performance", Organised Sound, vol. 8, No. 3, Dec. 2003, pp. 321-329.

Gao et al., "API recommendation for the development of Android App features based on the knowledge mined from App stores", Science of Computer Programming, vol. 202, No. 1, Feb. 1, 2021, pp. 102556.

Yeh et al., "Sikuli: Using GUI Screenshots for Search and Automation", UIST '09, vol. 01, Oct. 4, 2009, pp. 183-192.

Yi et al., "Development Approach Based on Extensible User Interface Description Language", Journal of Software, vol. 26, No. 07, Jul. 2015, pp. 1-14.

* cited by examiner

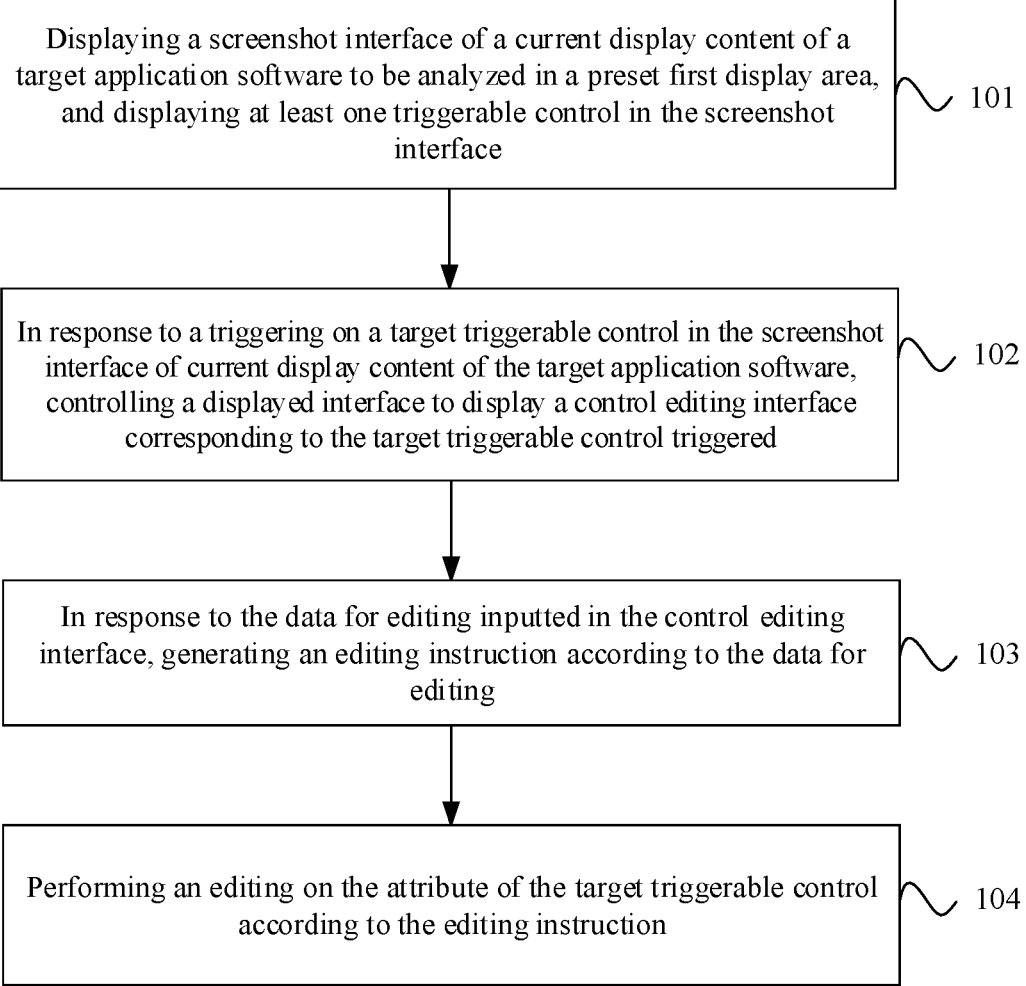

Displaying a screenshot interface of a current display content of a target application software to be analyzed in a preset first display area, and displaying at least one triggerable control in the screenshot interface    101

In response to a triggering on a target triggerable control in the screenshot interface of current display content of the target application software, controlling a displayed interface to display a control editing interface corresponding to the target triggerable control triggered    102

In response to the data for editing inputted in the control editing interface, generating an editing instruction according to the data for editing    103

Performing an editing on the attribute of the target triggerable control according to the editing instruction    104

Fig. 1

METHOD AND APPARATUS OF CONTROL EDITING, DEVICE, AND READABLE STORAGE MEDIUM

CROSS-REFERENCE TO RELATED APPLICATION

The present application claims priority of the Chinese Patent Application No. 202110793586.1, filed on Jul. 9, 2021, and entitled "Method and Apparatus of Control Editing, Device, Readable Storage Medium, and Product" the entire disclosure of which is incorporated herein by reference as part of the present application.

TECHNICAL FIELD

The embodiments of the present disclosure relate to a method and apparatus of control editing, a device, a readable storage medium and a product.

BACKGROUND

In the process of application software development, the debugging of User Interface Design (UI) controls is more complicated. Because of the large number of UI controls included in a display interface, how to quickly modify UI properties in a plurality of UI controls has become an urgent problem to be solved.

SUMMARY

The embodiments of the present disclosure provide a method and apparatus of control editing, a device, a readable storage medium and a product to solve the technical problems of cumbersome operation and low editing efficiency for the existing control editing.

In a first aspect, the embodiment of the present disclosure provides a method of control editing which includes:

displaying a screenshot interface of a current display content of a target application software to be analyzed in the preset first display area and displaying at least one triggerable control in the screenshot interface, the triggerable control corresponding to a target control in an interactive interface of the current display content of the target application software;

controlling a display interface to display a control editing interface corresponding to the target triggerable control triggered by a user in response to a triggering by the user on a target triggerable control in the screenshot interface of the current display content of the target application software, the control editing interface including an editable attribute corresponding to the target triggerable control, the target triggerable control is any triggerable control of the at least one triggerable control;

generating an editing instruction according to the data for editing in response to the data for editing inputted by the user in the control editing interface; and performing an editing on the attribute of the target triggerable control according to the editing instruction.

In a second aspect, the embodiment of the present disclosure provides an apparatus of control editing which includes:

a display module, configured to display the screenshot interface of the current display content of the target application software to be analyzed in a preset first display area and display at least one triggerable control in the screenshot interface, the triggerable control corresponding to the target control in the interactive interface of the current display content of the target application software;

a control module, configured to control the display interface to display the control editing interface corresponding to the target triggerable control triggered by the user, in response to the triggering by the user on the target triggerable control in the screenshot interface of the current display content of the target application software, the control editing interface comprising the editable attribute corresponding to the target triggerable control, the target triggerable control is any triggerable control of the at least one triggerable control;

a generation module, configured to generate an editing instruction according to the data for editing, in response to the data for editing inputted by the user in the control editing interface; and an editing module, configured to perform an editing on the attribute of the target triggerable control according to the editing instruction.

In a third aspect, the embodiment of the present disclosure provides an electronic device which includes: at least one processor and a memory;

the memory storing computer-executive instructions; and the at least one processor executing the computer-executive instructions stored in the memory, making the at least one processor executing the method of control editing as described in the first aspect above and in various possible designs of the first aspect.

In a fourth aspect, the embodiment of the present disclosure provides a computer-readable storage medium. The computer-readable storage medium stores computer-executive instructions. When the processor executes the computer-executive instruction, the method of control editing as described in the first aspect above and in various possible designs of the first aspect is implemented.

In a fifth aspect, the embodiment of the present disclosure provides a computer program product, including a computer program. When the computer program is executed by processors, the method of control editing as described in the first aspect above and in various possible designs of the first aspect is implemented.

In a sixth aspect, the embodiment of the present disclosure provides a computer program. When the computer program is executed by the processor, the method of control editing as described in the first aspect above and in various possible designs of the first aspect is implemented.

The embodiments of the present disclosure provide a method and apparatus of control editing, a device, a readable storage medium and a product. In the method, at first, after acquiring the triggering by the user on the preset data processing control, a screenshot interface of the current display content of a target application software to be analyzed is displayed in the preset first display area and at least one triggerable control is displayed in the screenshot interface. The user can determine the target triggerable control that need to be edited according to the content displayed in the current first display area. In response to the triggering by the user on the target triggerable control, the display interface is controlled to display the control editing interface corresponding to the target triggerable control triggered by the user, so that the user can achieve the editing on the target triggerable control in the control editing interface. Performing an editing on the target triggerable control through interface interaction can effectively simplify the process of the editing and improve the efficiency of the editing.

BRIEF DESCRIPTION OF THE DRAWINGS

In order to more clearly illustrate the technical solutions in the embodiments of the present disclosure or the prior art, the following will briefly introduce the accompanying drawings required in the embodiments or the prior art description. Apparently, the accompanying drawings described below are some embodiments of the present disclosure. For those of ordinary skill in the art, without the premise of creative labor, may also acquire other accompanying drawings according to these accompanying drawings FIG. 1 is a flowchart of a method of control editing provided by the first embodiment of the present disclosure.

DETAILED DESCRIPTION

Figure 2:
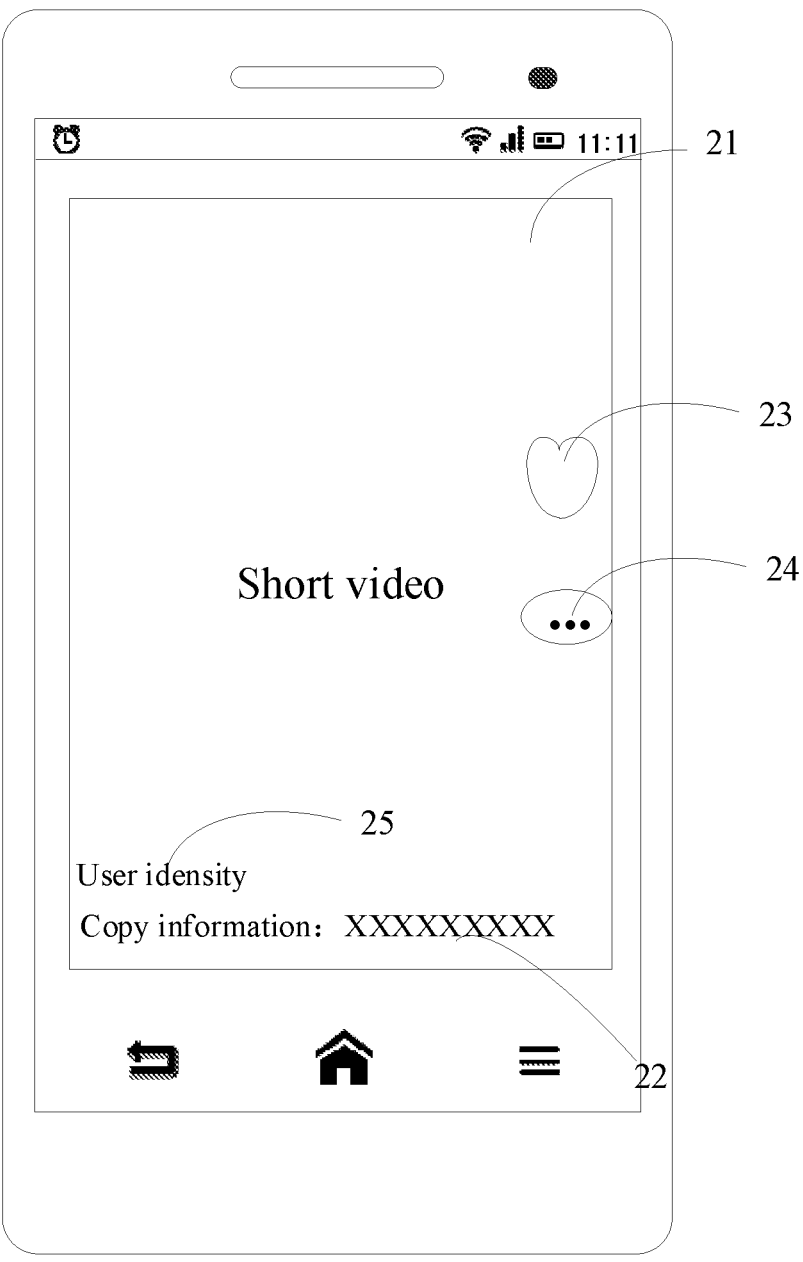
FIG. 2 is an interface diagram of the target application software provided by an embodiment of the present disclosure.

In order to make the purpose, technical solutions and advantages of the embodiments of the present disclosure clearer, the following will describe the technical solutions of the embodiments of the present disclosure clearly and completely, in conjunction with the accompanying drawings of the embodiments of the present disclosure. Apparently, the described embodiments are partial embodiments of the present disclosure instead of the whole embodiments. Based on the described embodiments of the present disclosure, all other embodiments acquired by those of ordinary skill in the art without the premise of creative labor, belong to the scope of the protection of the present disclosure.

With respect to the technical problems of cumbersome operation and low editing efficiency for the existing control editing mentioned above, the present disclosure provides a method and apparatus of control editing, a device, readable storage medium and a product.

It should be noted that the method and apparatus of control editing, the device, the readable storage medium and the product provided by the present disclosure may be used in various control editing scenarios.

FIG. 1 is a flowchart of a control editing method provided by the first embodiment of the present disclosure. As illustrated in FIG. 1, the method includes:

Step 101, displaying a screenshot interface of a current display content of a target application software to be analyzed in a preset first display area, and displaying at least one triggerable control in the screenshot interface. The triggerable control corresponds to the target control in an interactive interface of the current display content of the target application software.

The execution body of the present embodiment is an apparatus of control editing. The apparatus of control editing may be set in a terminal device, so that the editing can be performed on the target triggerable control selected by the user according to the interface interaction operation of the user.

Optionally, the apparatus of control editing may also be set in the server. The server can communicatively connect to the terminal device, so that the editing can be performed on the target triggerable control selected by the user according to the interface interaction between the user and the terminal device.

In the present embodiment, a plurality of target controls may be present in the interactive interface of the current display content of the target application software to be analyzed, and the target control can perform an interactive operation. In order to enable the user to perform the editing through the method of interface interaction on the target control that can be edited, the data processing control can be set on the display interface.

The user can perform the triggering on the data processing control. In response to the triggering, the screenshot interface of current display content of the target application software is displayed in the preset first display area, and at least one triggerable control is displayed in the screenshot interface of the preset first display area. The triggerable control corresponding to the target control of the interactive interface of the current display content of the target application software, can be configured to achieve the editing of the target control.

Step 102, in response to a triggering by a user on a target triggerable control in the screenshot interface of current display content of the target application software, controlling a displayed interface to display a control editing interface corresponding to the target triggerable control triggered by the user. The control editing interface includes an editable attribute corresponding to the target triggerable control, the target triggerable control is any triggerable control of the at least one triggerable control.

In the present embodiment, according to the actual demand, the user can select the target triggerable control that currently needs to be edited among a plurality of triggerable controls and trigger it. The target triggerable control is any triggerable control of the at least one triggerable control. In response to the triggering by the user on the target triggerable control, the control editing interface corresponding to the target triggerable control triggered by the user can be displayed on the display interface. The control editing interface can include the editable attribute corresponding to the target triggerable control. Optionally, the control editing interface can include all the editable attribute corresponding to the target triggerable control.

Step 103, in response to the data for editing inputted by the user in the control editing interface, generating an editing instruction according to the data for editing.

In the present embodiment, after displaying the control editing interface on the display interface, the user can input the data for editing in the area corresponding to the corresponding the editable attribute in the control editing interface, so that the apparatus of control editing can generate the editing instruction according to the data for editing inputted by the user.

Step 104, performing an editing on the attribute of the target triggerable control according to the editing instruction.

In the present embodiment, the apparatus of control editing can edit the attribute of the target triggerable control according to the data for editing in the editing instruction. Because the control editing interface can include the editable attribute corresponding to the target triggerable control, the user can achieve the editing on the attribute of the target triggerable control through interface interaction. Further, when the control editing interface includes all the editable attributes corresponding to the target triggerable control, the user can achieve the editing on all the attributes of the target triggerable control once through interface interaction, effectively improving the efficiency of control editing.

FIG. 2 is an interface diagram of the target application software provided by an embodiment of the present disclosure. As illustrated in FIG. 2, taking the target application software that is a short video application software as an example, the display interface of the short video application software 21 has a plurality of target controls. For example, the target control may include a copy control 22, a like control 23, a comment control 24, a user identity control 25, and the like.

Figure 3:
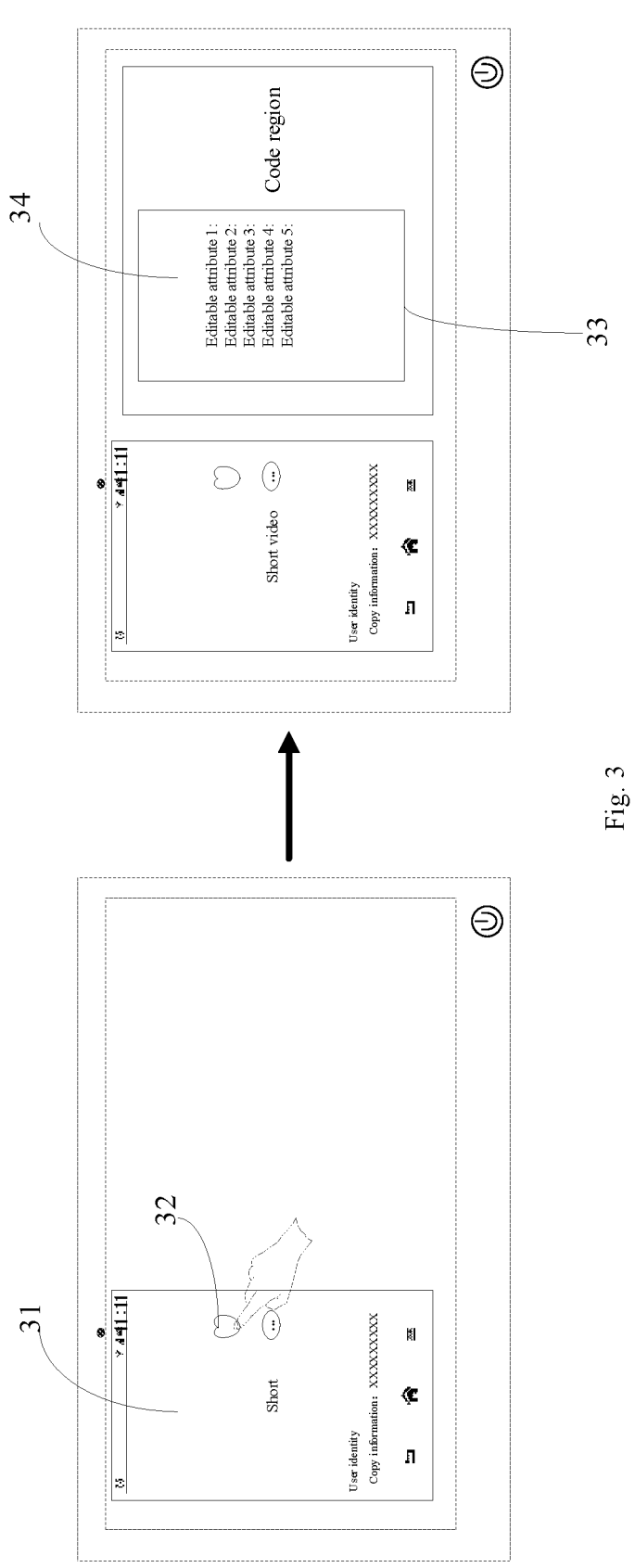
FIG. 3 is an interface interaction diagram provided by an embodiment of the present disclosure.

FIG. 3 is the interface interaction diagram provided by an embodiment of the present disclosure. As illustrated in FIG. 3, in response to the triggering by the user on the target triggerable control 32 of the screenshot interface 31 of the current display content of the target application software, the display interface can be controlled to display the control editing interface 33 corresponding to the target triggerable control 32 triggered by the user, the control editing interface 33 includes the editable attribute 34 corresponding to the target triggerable control 32.

For the method of control editing provided in the present embodiment, after first acquiring the triggering by the user on the preset data processing control, the method displays the screenshot interface of the current display content of the target application software to be analyzed in the preset first display area and displays at least one triggerable control in the screenshot interface. The user can determine the target triggerable control that need to be edited according to the content displayed in the current first display area. In response to the triggering by the user on the target triggerable control, the display interface is controlled to display a control editing interface corresponding to the target triggerable control triggered by the user, so that the user can achieve the editing on the target triggerable control in the control editing interface. Performing the editing on the target triggerable control through the method of interface interaction can effectively simplify the process of the editing and improve the efficiency of the editing.

Further, on the basis of the first embodiment, before step 101, the method further includes:

in response to an analysis instruction of the user for the target application software to be analyzed, acquiring a target code of the target application software.

In the present embodiment, the display interface may also set an analysis button. The user can initiate an analysis instruction by triggering the analysis button and achieve the next step of viewing the target code of the target application software. Specifically, in response to the analysis instruction of the user for the target application software to be analyzed, the target code of the target application software can be acquired.

Further, on the basis of the first embodiment, step 101 specifically includes:

in response to a triggering by the user on a preset data processing control, acquiring the interactive interface of the current display content of the target application software and the location information of the target control on the interactive interface; and according to the interactive interface and the location information of the target control, displaying the screenshot interface of the current display content of the target application software to be analyzed in the preset first display area and displaying at least one triggerable control in the screenshot interface.

In the present embodiment, after acquiring the triggering by the user on the preset data processing control, according to the triggering, the interactive interface of the content currently displayed of the target application software can be acquired. Specifically, the content currently displayed of the target application software can be screenshotted to acquire the screenshot interface corresponding to the interactive interface. Further, the location information of the target control on the interactive interface can also be determined, the location information of the target control can be represented by coordinate position.

Further, on the basis of any of the above embodiments, step 102 specifically includes:

in response to the triggering by the user on the target triggerable control, a broadcast instruction is sent to the preset software development kit, so that the software development kit acquires the code information corresponding to the target triggerable control according to the broadcast instruction. Thus, based on the editing by the user, the interactive control can be edited, that is, the code information corresponding to the interactive control can be modified.

In the present embodiment, acquiring code information can be performed specifically by a preset software development kit. Specifically, after acquiring the triggering by the user on the target triggerable control, the plug-in can acquire the screenshot interface of the current content, and sends the broadcast instruction to the preset software development kit according to the screenshot interface, so that the software development kit can acquire the information corresponding to all interactive controls on the screenshot interface according to the broadcast instruction after acquiring the broadcast instruction. Specifically, the software development kit serializes the location information of the code acquired by running the pre-embedded analysis code and outputs the serialized location information of the code to the command line, and returns the command line to the preset plug-in. The preset plug-in parses the command-line content, restores the information when the application software is running, simultaneously acquires the screenshot of the content currently displayed of the application software, corresponds the screenshot with the information when the application software is running, and generates the triggerable control.

Further, on the basis of the first embodiment, step 104 specifically includes:

sending the editing instruction to the preset software development kit so that the software development kit calls a preset editing method, and performs the editing for the attribute of the target triggerable control according to the data for editing.

In the present embodiment, after acquiring the editing instruction, the editing instruction can be sent to the preset software development kit. After acquiring the editing instruction, the software development kit can call the preset editing method, and according to the editing method and the data for editing, jointly edit the attribute of the target triggerable control, the preset editing method can be the preset editing method in the Android system.

Further, on the basis of the first embodiment, step 103 specifically includes:

serializing the data for editing, and determining the data for editing after the serialization processing to be the editing instruction.

In the present embodiment, after acquiring the edit data, the data for editing can be serialized to acquire the data for editing after the serialization processing, which is determined as an editing instruction. By serializing the data for editing to generate an edit instruction, the subsequent transmission efficiency of the edit instruction can be improved, and the editing efficiency of the target triggerable control can be further improved.

Further, on the basis of the first embodiment, after step 104, the method further includes:

controlling the display interface to display an edited target triggerable control in real time.

In the present embodiment, in order to make the user more intuitive to determine the current editing effect, after performing the editing on the target triggerable control according to the editing instruction, the display interface can be controlled to display the edited target triggerable control in real time.

Figure 4:
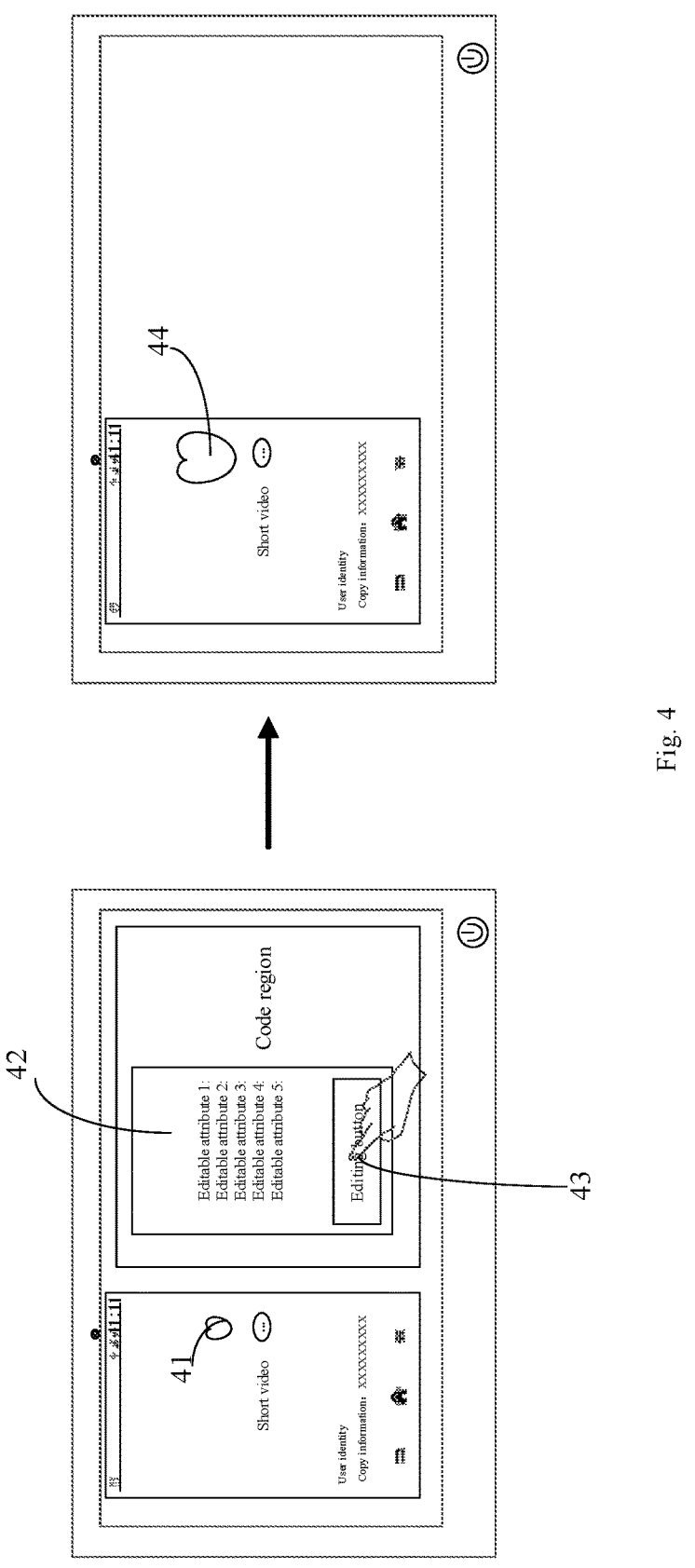
FIG. 4 is yet another interface interaction diagram provided by an embodiment of the present disclosure.

FIG. 4 is another interface interaction diagram provided by an embodiment of the present disclosure. As illustrated in FIG. 4, in terms of distance adjustment for the size of the control, after detecting the triggering by the user on the editing button 43 in the control editing interface 42 corresponding to the target triggerable control 41, the display size of the target triggerable control 41 can be adjusted, and the display interface is controlled to display the adjusted triggerable control 44.

The method of control editing provided by the present embodiment, after the editing, controls the display interface to display the edited target triggerable control in real time, so that the user can view the current editing effect of the target triggerable control in real time, and then can further adjust the target triggerable control, which makes the adjusted target triggerable control more conforming to the actual needs of the user.

Further, on the basis of the first embodiment, step 103 specifically includes:

acquiring the data for editing inputted by the user in an editing field corresponding to at least one editable attribute in the control editing interface; and in response to the user triggering the preset editing button in the control editing interface, generating an editing instruction according to the data for editing.

In the present embodiment, the control editing interface may include the editing field corresponding to at least one editable attribute, the user can input edit data in each editing field. Accordingly, the apparatus of control editing can acquire the data for editing inputted by the user. In addition, the control editing interface also set an editing button, which can be triggered to achieve the generation of editing instructions when the user completes inputting the data for editing. Accordingly, the apparatus of control editing can generate the editing instruction according to the data for editing in response to the user triggering the preset editing button in the control editing interface.

Figure 5:
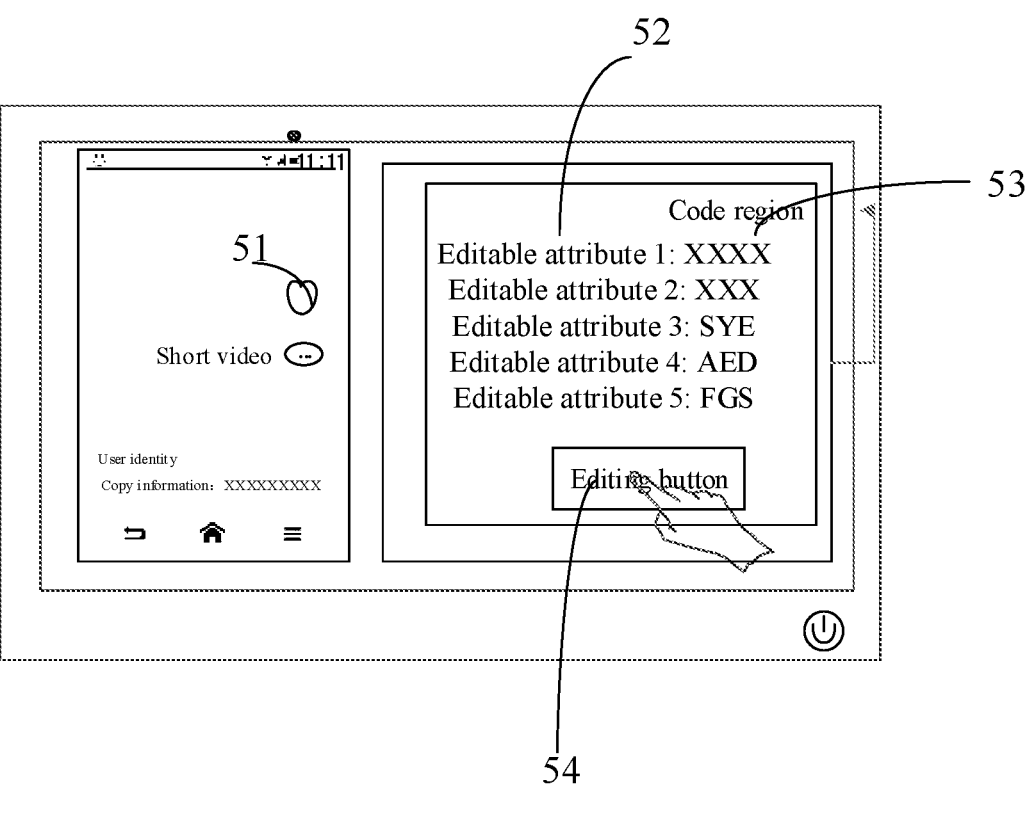
FIG. 5 is yet another interface interaction diagram provided by an embodiment of the present disclosure.

FIG. 5 is another interface interaction diagram provided by an embodiment of the present disclosure. As illustrated in FIG. 5, the user can input the data for editing in the editing field 53 corresponding to at least one editable attribute in the control editing interface 52 corresponding to the target triggerable control 51, and can trigger the preset editing button 54 to achieve the generation operation of the editing instruction after completing the editing.

The method of control editing provided by the present embodiment, after completing inputting the data for editing, in response to the user triggering the preset editing button in the control editing interface, generates the editing instruction according to the data for editing in order to enable the editing on the target triggerable control through interface interaction, effectively simplifying the editing process and improving the efficiency of the editing.

Figure 6:
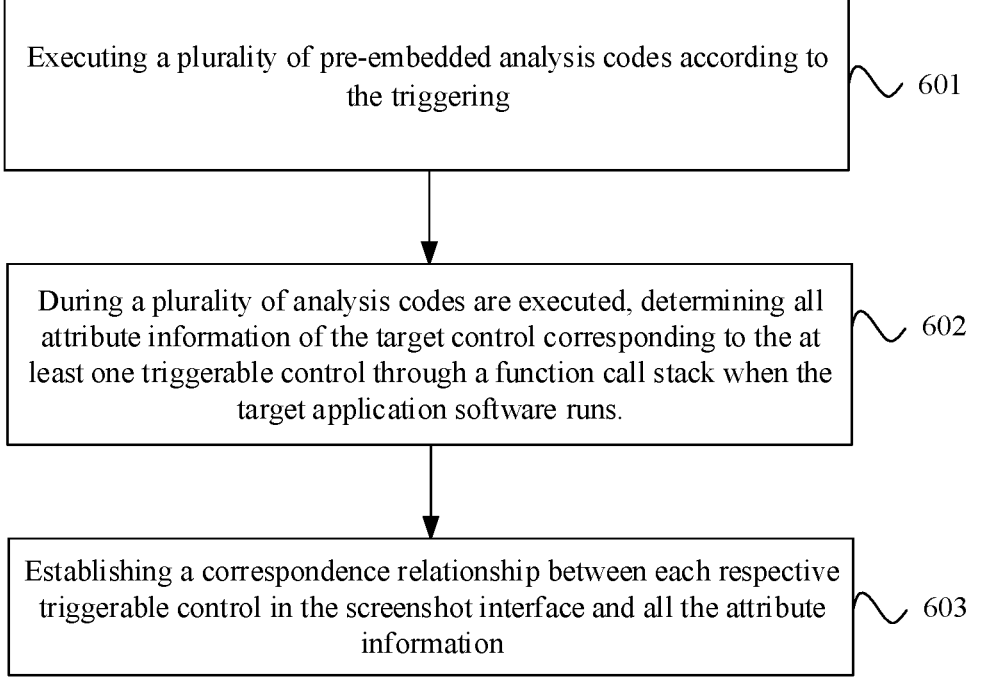
FIG. 6 is a flowchart of a method of control editing provided by the second embodiment of the present disclosure.

FIG. 6 is a flowchart of the method of control editing provided by the second embodiment of the present disclosure, based on the first embodiment, as illustrated in FIG. 6, after step 101, the method further including:

Step 601: executing a plurality of pre-embedded analysis codes according to the triggering.

Step 602: during a plurality of analysis codes are executed, determining all attribute information of the target control corresponding to the at least one triggerable control through a function call stack when the target application software runs.

Step 603: establishing a correspondence relationship between each respective triggerable control in the screenshot interface and all the attribute information.

In the present embodiment, after acquiring the triggering by the user on the preset data processing control, a plurality of pre-embedded analysis codes can be run according to the triggering. During a plurality of analysis codes are executed, the function call stack can be used to determine all attribute information of the target control corresponding to at least one triggerable control when the target application software runs. In order to achieve the attribute editing on the triggerable control, the correspondence relationship between each respective triggerable control in the screenshot interface and all attribute information is required to be established, so that according to the correspondence relationship, the attribute of the triggerable control can be accurately edited later.

The method of control editing provided by the present embodiment, through establishing the correspondence relationship between each respective triggerable control in the screenshot interface and all attribute information, can accurately achieve the editing on the target triggerable control selected by the user later, and further improve the editing efficiency of the control.

Figure 7:
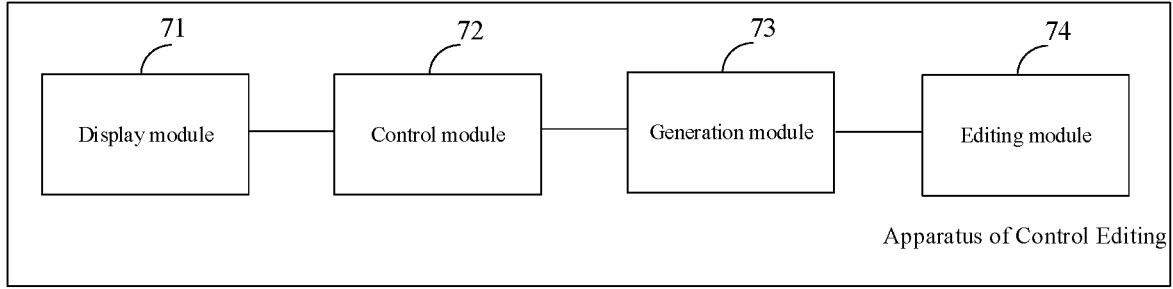
FIG. 7 is a structure diagram of an apparatus of control editing provided by the third embodiment of the present disclosure.

FIG. 7 is a structure diagram of the apparatus of control editing provided by the third embodiment of the present disclosure. As illustrated in FIG. 7, the apparatus includes: a display module 71, a control module 72, a generation module 73, and an editing module 74, the display module 71 is configured to display the screenshot interface of the current display content of the target application software to be analyzed in the preset first display area, and to display at least one triggerable control in the screenshot interface, and the triggerable control corresponds to the target control in the interactive interface of the current display content of the target application software; the control module 72 is configured to correspond to the triggering by the user on the target triggerable control in the screenshot interface of the current display content of the target application software, and to control the display interface to display the control editing interface corresponding to the target triggerable control triggered by the user, the control editing interface includes the editable attribute corresponding to the target triggerable control, the target triggerable control is any triggerable control among the at least one triggerable control; the generation module 73, is configured to correspond to the data for editing inputted by the user in the control editing interface, and to generate the editing instruction according to the data for editing; the editing module 74 is configured to perform the editing on the attribute of the target triggerable control according to the editing instruction.

Further, on the basis of the third embodiment, the apparatus further includes: an acquiring module for acquiring the target code of the target application software in response to the analysis instruction of the user for the target application software to be analyzed.

Further, on the basis of any of the above embodiments, the display module is configured to correspond to the triggering by the user on the preset data processing control, to acquire the interactive interface of the current display content of the target application software and the location information of the target control on the interactive interface: according to the interactive interface and the location information of the target control, the screenshot interface of the current display content of the target application software to be analyzed is displayed in the preset first display area and at least one triggerable control is displayed in the screenshot interface.

Further, on the basis of any of the above embodiments, the editing module is configured to send the editing instruction to the preset software development kit so that the software development kit calls the preset editing method, and the perform the editing on the attribute of the target triggerable control according to the data for editing.

Further, on the basis of any of the above embodiments, the generation module is configured to serialize the data for editing, and determine the data for editing after the serialization processing to be the editing instruction.

Further, on the basis of any of the above embodiments, the apparatus further includes: a control module, also configured to control the display interface to display the edited target trigger control in real time.

Further, on the basis of any of the above embodiments, the generation module is configured to: acquire the data for editing inputted by the user in the editing field corresponding to at least one editable attribute in the control editing interface; and in response to the user triggering the preset editing button within the control editing interface, generate an editing instruction according to the data for editing.

Further, on the basis of any of the above embodiments, the apparatus further includes: an execution module, configured to execute a plurality of pre-embedded analysis codes according to the triggering: a deterministic module, during a plurality of analysis codes are executed, configured to determine all the attribute information of the target control corresponding to the at least one triggerable control through the function call stack when the target application software is executed; and an establishing module, configured to establish the correspondence relationship between each respective triggerable control in the screenshot interface and all the attribute information.

Yet another embodiment of the present disclosure also provides an electronic device which includes at least one processor and memory;

the memory stores computer-executive instructions; and the at least one processor executes the computer-executive instructions stored in the memory, making the at least one processor executing the method of control editing as described in any of the above embodiments.

Yet another embodiment of the present disclosure also provides a computer-readable storage medium, the computer-readable storage medium stores computer-executive instructions, and the method of control editing as described in any of the above embodiments is implemented when the processor executes the computer-executive instructions.

Yet another embodiment of the present disclosure also provides a computer program product which includes a computer program. The method of control editing as described in any of the above embodiments is implemented when the computer program is executed by the processor.

The device provided by the present embodiment can be configured to execute the technical solution as described in the method embodiment above, the implementation principle of the device is similar to the technical effect, and the present embodiment will not be repeated herein.

Figure 8:
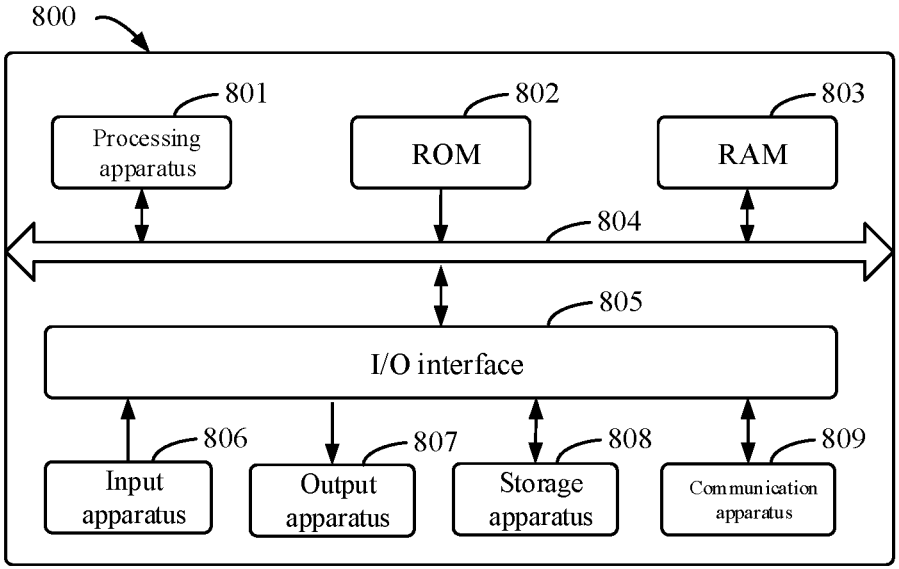
FIG. 8 is a structure diagram of an electronic device provided by the fourth embodiment of the present disclosure.

FIG. 8 is a structure diagram of the electronic device provided by the fourth embodiment of the present disclosure, as illustrated in FIG. 8, it is illustrated a structure diagram suitable for implementing an electronic device 800 of the embodiment of the present disclosure, and the electronic device 800 may be a terminal device or a server, the terminal device may include, but is not limited to, a mobile terminal such as a mobile phone, a laptop, a digital broadcast receiver, a personal digital assistant (PDA), a portable Android device (PAD), a portable multimedia player (PMP), a vehicle terminal (such as a car navigation terminal) and so on, and a fixed terminal such as a digital TV, a desktop computer and so on. The electronic device illustrated in FIG. 8 is only an example, which should not bring about any limitation on the functionality or scope of use of the embodiments of the present disclosure.

As illustrated in FIG. 8, the electronic device 800 may include a processing apparatus (such as a central processing unit, a graphics processor, etc.) 801, which can execute a variety of suitable actions and processing according to the program stored in a read only memory (ROM) 802 or the program loaded into a random access memory (RAM) 803 from the storage device 808. In RAM 803, various programs and data required for the operation of the electronic device 800 are also stored. The processing apparatus 801, ROM 802 and RAM 803 are connected to each other via bus 804. Input/output (I/O) interface 805 is also connected to the bus 804.

Conventionally; the following apparatuses can be connected to the I/O interface 805: including an input apparatus 806 such as a touch screen, a touchpad, a keyboard, a mouse, a camera, a microphone, an accelerometer, a gyroscope and so on: including an output apparatus 807, such as a liquid crystal display (LCD), a speaker, a vibrator, and so on: including a storage apparatus 808 such as a magnetic tape, a hard disk and so on; and a communication apparatus 809. The communication apparatus 809 can allow the electronic device 800 to perform wireless or wire lined communication with other devices to exchange data. Although FIG. 8 illustrates the electronic device 800 including various apparatuses, it should be understood that the electronic device 800 is not required implementing or having all of the apparatuses illustrated. The electronic device 800 can be implemented alternatively or with more or fewer apparatuses.

In particular, according to the embodiments of the present disclosure, the process described above with reference to the flowchart can be implemented as a computer software program. For example, the embodiment of the present disclosure includes a computer program product, which includes a computer program hosted on the computer-readable medium, and the computer program includes the program code for performing the method shown in the flowchart. In such embodiment, the computer program can be downloaded and installed from the network through the communication apparatus 809, or be installed from the storage apparatus 808, or be installed from the ROM 802. When the computer program is executed by the processing apparatus 801, the above functions that are limited by the method of the embodiment of the present disclosure are performed.

It should be noted that the computer-readable medium described in the present disclosure may be a computer-readable signal medium or a computer-readable storage medium, or any combination of the two described above. Computer-readable storage media, for example, may be, but not limited to, an electrical, magnetic, optical, electromagnetic, infrared, or semiconductor system, apparatus or equipment, or any combination thereof. More specific examples of computer-readable storage media may include, but are not limited to: an electrical connection with one or more wires, a portable laptop disk, a hard disk, a Random Access Memory (RAM), a Read Only Memory (ROM), an Erasable Programmable Read-Only Memory (EPROM or flash memory), an optical fiber, a portable Compact Disk Read-Only Memory (CD-ROM), an optical memory equipment, a magnetic memory equipment, or any suitable combination thereof. In the present disclosure, the computer-readable storage medium may be any tangible medium including or storing a program, and the program may be used by an instruction execution system, an apparatus or an equipment, or in combination with the instruction execution system, the apparatus or the equipment. In the present disclosure, the computer-readable signal medium may include a data signal on baseband or propagated as part of a carrier, which hosts the computer-readable program code. The propagated data signal can take many forms, including but not limited to electromagnetic signals, optical signals, or any suitable combination thereof. The computer-readable signal medium may also be any computer-readable medium other than the computer-readable storage medium, the computer-readable signal medium can send, propagate, or transmit the program used by the instruction execution system, an apparatus or an equipment, or in combination with the instruction execution system, the apparatus or the equipment. The program code included on the computer-readable medium can be transmitted via any suitable medium, including but not limited to: a wire, an optical cable, radio frequency (RF), etc., or any suitable combination thereof.

The computer-readable medium described above may be included in the electronic device described above: may also exist alone and not be incorporated into the electronic device.

The computer-readable medium described above hosts one or a plurality of programs, and when one or a plurality of the programs are executed by the electronic device, the electronic device performs the method shown in the above embodiment.

Computer program code may be written in one or more programming languages or combinations thereof to perform the operations of the present disclosure, the programming language including object-oriented programming languages, such as Java, Smalltalk and C++, and also including a general procedural programming language, such as "C" language or similar programming languages. The program code can be executed entirely on the computer of the user, be executed partially on the computer of the user, be executed as a stand-alone software package, be executed partly on the computer of the user and partially on a remote computer, or be executed completely on a remote computer or server. In the case of relating to the remote computer, the remote computer can connect to the computer of the user through any type of networks, including Local Area Network (LAN) or Wide Area Network (WAN), or can connect to an external computer (for example, using an Internet service provider to connect via the Internet).

The flowchart and block diagram in the accompanying drawings illustrate architectures, functions and operations, which can be implemented according to the systems, methods and computer program products of the various embodiments of the present disclosure. At this point, each box in the flowchart or block diagram may represent a module, a segment, or a portion of code, and the module, the segment, or the portion of code includes one or a plurality of executable instructions for implementing the specified logical function. It should also be noted that in some alternative implementations, the functions indicated in the box may also occur in a different order from those indicated in the drawings. For example, two boxes represented consecutively can actually be executed basically in parallel, and they can sometimes be executed in reverse order, depending on the related function. It should also be noted that each box in the block diagram and/or flowchart, and the combination of boxes in the block diagram and/or flowchart, can be implemented by a dedicated hardware-based system that performs a specified function or operation, or can be implemented by a combination of the dedicated hardware and the computer instruction.

The related unit described in the embodiment of the present disclosure can be implemented by the method of the software or by the method of the hardware, the name of the unit does not constitute a limitation of the unit itself in a certain circumstance, for example, the first acquiring unit may also be described as "acquiring at least two units of Internet Protocol addresses".

The functions described above in this article may be performed at least in part by one or a plurality of hardware logic components. For example, non-restrictively, the hardware logic components that belong to the demonstration type and can be used include: Field Programmable Gate Array (FPGA), Application Specific Integrated Circuit (ASIC), Application Specific Standard Product (ASSP), System on a Chip (SOC), Complex Programmable Logic Apparatus (CPLD) and so on.

In the context of the present disclosure, the machine-readable medium can be a tangible medium which may include or store a program used by the instruction execution system, the apparatus or the device, or in combination with the instruction execution system, the apparatus or the device. Machine-readable media can be machine-readable signal media or machine-readable storage media. Machine-readable media can include, but are not limited to, an electronic, magnetic, optical, electromagnetic, infrared, or semiconductor system, apparatus or device, or any suitable combination thereof. More specific examples of the machine-readable storage media could include the electrical connection based on one or a plurality of wires, portable laptop disks, hard disks, Random Access Memory (RAM), Read Only Memory (ROM), Erasable Programmable Read-Only Memory (EPROM or flash memory), optical optics, Compact Disk Read-Only Memory (CD-ROM), optical storage devices, magnetic storage devices, or any suitable combination of the above.

In the first aspect, according to one or a plurality of embodiments of the present disclosure, a method of control editing is provides, including:

displaying a screenshot interface of a current display content of the target application software to be analyzed in the preset first display area and displaying at least one triggerable control in the screenshot interface, and the triggerable control corresponding to the target control in the interactive interface of the current display content of the target application;

in response to the triggering by the user on the target triggerable control in the screenshot interface of the content currently displayed of the target application software, controlling the display interface to display the control editing interface corresponding to the target triggerable control triggered by the user, and the control editing interface including an editable attribute corresponding to the target triggerable control, the target triggerable control is any triggerable control of the at least one triggerable control;

in response to the data for editing inputted by the user in the control editing interface, generating the editing instruction according to the data for editing; and according to the editing instruction, performing the editing on the attribute of the target triggerable control.

According to one or a plurality of embodiments of the present disclosure, in response to the triggering by the user on the preset data processing button, before displaying the screenshot interface of the current display content of the target application software to be analyzed in the preset first display area and displaying at least one triggerable control in the screenshot interface, further including: in response to the analysis instruction of the user for the target application software to be analyzed, acquiring the target code of the target application software.

According to one or a plurality of embodiments of the present disclosure, the screenshot interface of the current display content of the target application software to be analyzed displayed in the preset first display area includes: in response to the triggering by the user on the preset data processing control, acquiring the interactive interface of the current display content of the target application software and the location information of the target control on the interactive interface; and according to the interactive interface and the location information of the target control, displaying the screenshot interface of the current display content of the target application software to be analyzed in the preset first display area and displaying at least one triggerable control in the screenshot interface.

According to one or a plurality of embodiments of the present disclosure, the editing on the attribute of the target-triggerable control according to the editing instruction, includes: sending the editing instruction to the preset software development kit so that the software development kit calls the preset editing method, and performing the editing on the attribute of the target triggerable control according to the data for editing.

According to one or a plurality of embodiments of the present disclosure, the editing instruction is generated according to the data for editing, including: serializing the data for editing, and determining the data for editing after the serialization processing as the editing instruction.

According to one or a plurality of embodiments of the present disclosure, after editing the attribute of the target triggerable control according to the editing instruction, further including: controlling the display interface to display the edited target triggerable control in real time.

According to one or a plurality of embodiments of the present disclosure, in response to the data for editing inputted by the user in the control editing interface, generating the editing instruction according to the data for editing, includes: acquiring the data for editing inputted by the user in the editing field corresponding to at least one editable attribute in the control editing interface; and in response to the preset editing button triggered by the user in the control editing interface, generating an editing instruction according to the data for editing.

According to one or a plurality of embodiments of the present disclosure, after corresponding to the triggering by the user on the preset data processing button, further includes: according to the triggering, executing a plurality of pre-embedded analysis codes: during a plurality of pre-embedded analysis codes are executed, determining all the attribute information of the target control corresponding to the at least one triggerable control by the function call stack when the target application software is executed; and establishing the correspondence relationship between each respective triggerable control in the screenshot interface and all the attribute information.

In the second aspect, according to one or a plurality of embodiments of the present disclosure, an apparatus of control editing is provided, including:

a display module, configured to display the screenshot interface of the current display content of the target application software to be analyzed in a preset first display area and display at least one triggerable control in the screenshot interface, the triggerable control corresponding to the target control in the interactive interface of the current display content of the target application software;

a control module, configured to control the display interface to display the control editing interface corresponding to the target triggerable control triggered by the user, in response to the triggering by the user on the target triggerable control in the screenshot interface of the current display content of the target application software, the control editing interface including the editable attribute corresponding to the target triggerable control, the target triggerable control is any triggerable control of the at least one triggerable control;

a generation module, configured to generate an editing instruction according to the data for editing, in response to the data for editing inputted by the user in the control editing interface; and an editing module, configured to perform an editing for the attribute of the target triggerable control according to the editing instruction.

According to one or a plurality of embodiments of the present disclosure, the apparatus further includes: an acquiring module, configured to acquire the target code of the target application software in response to the analysis instruction of the user for the target application software to be analyzed.

According to one or a plurality of embodiments of the present disclosure, the display module is configured to acquire the interactive interface of the current display content of the target application software and the location information of the target control on the interactive interface.

According to one or a plurality of embodiments of the present disclosure, the editing module is configured to send the editing instruction to the preset software development kit so that the software development kit calls the preset editing method, and perform the editing on the attribute of the target triggerable control according to the data for editing.

According to one or a plurality of embodiments of the present disclosure, the generation module is configured to serialize the data for editing, and determining the data for editing after the serialization processing as the editing instruction.

According to one or a plurality of embodiments of the present disclosure, the apparatus further includes: a control module, also configured to control the display interface to display the edited target trigger control in real time.

According to one or a plurality of embodiments of the present disclosure, the generation module is configured to acquire data for editing inputted by the user in the editing field corresponding to at least one editable attribute in the control editing interface; and in response to the preset editing button triggered by the user in the control editing interface, generating the editing instruction according to the data for editing.

According to one or a plurality of embodiments of the present disclosure, the apparatus further includes: an execution module configured to execute a plurality of pre-embedded analysis codes according to the triggering: a deterministic module, during a plurality of analysis code are executed, configured to determine all the attribute information of the target control corresponding to at least one triggerable control through the function call stack when the target application software is executed: an establishing module, configured to establish the correspondence relationship between each respective triggerable control in the screenshot interface and all the attribute information.

In the third aspect, according to one or a plurality of embodiments of the present disclosure, an electronic device is provided, including: at least one processor and memory;
    the memory storing the computer-executive instruction; and
    the at least one processor executing the computer-executive instruction stored in the memory, making the at least one processor executing the method of control editing as described in the first aspect above and in various possible designs of the first aspect.

In the fourth aspect, according to one or a plurality of embodiments of the present disclosure, a computer-readable storage medium is provided, and the computer-readable storage medium stores the computer-executive instruction. When the processor executes the computer-executive instruction, the method of control editing as described in the first aspect above and in various possible designs of the first aspect is implemented.

In the fifth aspect, according to one or a plurality of embodiments of the present disclosure, a computer program product is provided, including a computer program. When the computer program is executed by the processor, the method of control editing as described in the first aspect above and in various possible designs of the first aspect is implemented.

In the sixth aspect, according to one or a plurality of embodiments of the present disclosure, a computer program is provided. When the computer program is executed by the processor, the method of control editing as described in the first aspect above and in various possible designs of the first aspect is implemented.

The above description is only a better embodiment of the present disclosure and an illustration of the used technical principles. Those skilled in the art should understand that the scope of disclosure involved in the present disclosure is not limited to the technical solution of the particular combination of the above technical features, but should also cover other technical solutions formed by any combination of the above technical features or their equivalent features without departing from the concept of the present disclosure. For example, the features described above and the technical features with similar functions and disclosed in the present disclosure (but not limited to) replace each other to form a technical solution.

In addition, although each operation is described in a specific order, this should not be understood as requiring these operations to be performed in the indicated specific order or in the sequential order. In a certain circumstance, multitasking and parallel processing may be beneficial. Similarly, although a number of specific implementation details are included in the above, these should not be explained as the limitation of the scope of the present disclosure. Certain features described in the context of an individual embodiment can also be implemented in combination in a single embodiment. Conversely, the various features described in the context of a single embodiment can also be implemented individually or in any suitable subcombination in a plurality of embodiments.

Although the present subject matter has been described in language specific to structural features and/or method logical actions, it should be understood that the subject matter defined in the appended claims is not necessarily limited to the specific features or actions described above. On the contrary, the specific features and actions described above are just exemplary forms of implementing the claims.

What is claimed is:

1. A method of control editing, comprising:
displaying a screenshot interface of a current display content of a first application software to be analyzed in a preset first display area and displaying at least one triggerable control in the screenshot interface, the triggerable control corresponding to a first control in an interactive interface of the current display content of the first application software;
controlling a display interface to display a control editing interface corresponding to the first triggerable control triggered in response to a triggering on a first triggerable control in the screenshot interface of the current display content of the first application software, the control editing interface comprising an editable attribute corresponding to the first triggerable control, wherein the first triggerable control is any triggerable control of the at least one triggerable control;
generating an editing instruction according to the data for editing in response to data for editing inputted in the control editing interface; and
performing an editing on the attribute of the first triggerable control according to the editing instruction,
wherein the controlling the display interface to display the control editing interface corresponding to the first triggerable control triggered in response to the triggering on the first triggerable control in the screenshot interface of the current display content of the first application software comprises:
    acquiring the screenshot interface of the current display content of the first application software, and sending an instruction, wherein the instruction is configured to instruct a preset software development kit to acquire information corresponding to all interactive controls on the screenshot interface according to the screenshot.

2. The method of claim 1, before displaying the screenshot interface of the current display content of the first application software to be analyzed in the preset first display area and before displaying the at least one triggerable control displayed in the screenshot interface, further comprising:
    acquiring a first code of the first application software, in response to an analysis instruction for the first application software to be analyzed.

3. The method of claim 1, wherein, displaying the screenshot interface of the current display content of the first application software to be analyzed in the preset first display area, comprises:

acquiring the interactive interface of the current display content of the first application software and a location information of the first control on the interactive interface, in response to a triggering on a preset data processing control; and displaying the screenshot interface of the current display content of the first application software to be analyzed in the preset first display area and displaying the at least one triggerable control in the screenshot interface according to the interactive interface and the location information of the first control.

4. The method according to claim 1, wherein, performing the editing for the attribute of the first triggerable control according to the editing instruction, comprises:

sending the editing instruction to a preset Software Development Kit (SDK) whereby the SDK calls a preset editing method and performs the editing for the attribute of the first triggerable control according to the data for editing.

5. The method according to claim 1, wherein, generating the editing instruction according to the data for editing, comprises:

performing a serialization processing for the data for editing, and determining the data for editing after the serialization processing as the editing instruction.

6. The method according to claim 1, after performing editing for the attribute of the first triggerable control according to the editing instruction, further comprising:

controlling the display area to display an edited first triggerable control in real time.

7. The method according to claim 1, wherein in response to the data for editing inputted in the control editing interface, generating the editing instruction according to the data for editing, comprises:

acquiring the data for editing inputted an editing field corresponding to the at least one editable attribute in the control editing interface; and generating the editing instruction according to the data for editing, in response to a preset editing button triggered in the control editing interface.

8. The method according to claim 1, before displaying the screenshot interface of the current display content of the first application software to be analyzed in the preset first display area and before displaying the at least one triggerable control displayed in the screenshot interface, further comprising:

executing a plurality of pre-embedded analysis codes according to the triggering;

during the plurality of analysis codes are executed, determining all attribute information of the first control corresponding to the at least one triggerable control through a function call stack when the first application software is executed; and establishing a correspondence relationship between respective triggerable control in the screenshot interface and all the attribute information.

9. An electronic device, comprising:

at least one processor and a memory;

the memory storing computer-executive instructions; and the at least one processor executing the computer-executive instructions stored by the memory, making the at least one processor executing a method of control editing and the method comprises:

displaying a screenshot interface of a current display content of a first application software to be analyzed in a preset first display area and displaying at least one triggerable control in the screenshot interface, the triggerable control corresponding to a first control in an interactive interface of the current display content of the first application software;

controlling a display interface to display a control editing interface corresponding to the first triggerable control triggered in response to a triggering on a first triggerable control in the screenshot interface of the current display content of the first application software, the control editing interface comprising an editable attribute corresponding to the first triggerable control, wherein the first triggerable control is any triggerable control of the at least one triggerable control;

generating an editing instruction according to the data for editing in response to data for editing inputted in the control editing interface; and performing an editing on the attribute of the first triggerable control according to the editing instruction, wherein the controlling the display interface to display the control editing interface corresponding to the first triggerable control triggered in response to the triggering on the first triggerable control in the screenshot interface of the current display content of the first application software comprises:

acquiring the screenshot interface of the current display content of the first application software, and sending an instruction, wherein the instruction is configured to instruct a preset software development kit to acquire information corresponding to all interactive controls on the screenshot interface according to the screenshot.

10. The electronic device of claim 9, before displaying the screenshot interface of the current display content of the first application software to be analyzed in the preset first display area and before displaying the at least one triggerable control displayed in the screenshot interface, further comprising:

acquiring a first code of the first application software, in response to an analysis instruction for the first application software to be analyzed.

11. The electronic device of claim 9, wherein, displaying the screenshot interface of the current display content of the first application software to be analyzed in the preset first display area, comprises:

acquiring the interactive interface of the current display content of the first application software and a location information of the first control on the interactive interface, in response to a triggering on a preset data processing control; and displaying the screenshot interface of the current display content of the first application software to be analyzed in the preset first display area and displaying the at least one triggerable control in the screenshot interface according to the interactive interface and the location information of the first control.

12. The electronic device according to claim 9, wherein, performing the editing for the attribute of the first triggerable control according to the editing instruction, comprises:

sending the editing instruction to a preset Software Development Kit (SDK) whereby the SDK calls a preset editing method and performs the editing for the attribute of the first triggerable control according to the data for editing.

13. The electronic device according to claim 9, wherein, generating the editing instruction according to the data for editing, comprises:

performing a serialization processing for the data for editing, and determining the data for editing after the serialization processing as the editing instruction.

14. The electronic device according to claim 9, after performing editing for the attribute of the first triggerable control according to the editing instruction, further comprising:

controlling the display area to display an edited first triggerable control in real time.

15. The electronic device according to claim 9, wherein in response to the data for editing inputted in the control editing interface, generating the editing instruction according to the data for editing, comprises:

acquiring the data for editing inputted an editing field corresponding to the at least one editable attribute in the control editing interface; and generating the editing instruction according to the data for editing, in response to a preset editing button triggered in the control editing interface.

16. The electronic device according to claim 9, before displaying the screenshot interface of the current display content of the first application software to be analyzed in the preset first display area and before displaying the at least one triggerable control displayed in the screenshot interface, further comprising:

executing a plurality of pre-embedded analysis codes according to the triggering;

during the plurality of analysis codes are executed, determining all attribute information of the first control corresponding to the at least one triggerable control through a function call stack when the first application software is executed; and establishing a correspondence relationship between respective triggerable control in the screenshot interface and all the attribute information.

17. A non-transitory computer-readable storage medium, wherein the non-transitory computer-readable storage medium stores computer-executive instructions, and the computer-executive instructions, when executed by a processor, cause the processor to perform a method of control editing and the method comprises:

displaying a screenshot interface of a current display content of a first application software to be analyzed in a preset first display area and displaying at least one triggerable control in the screenshot interface, the triggerable control corresponding to a first control in an interactive interface of the current display content of the first application software;

controlling a display interface to display a control editing interface corresponding to the first triggerable control triggered in response to a triggering on a first triggerable control in the screenshot interface of the current display content of the first application software, the control editing interface comprising an editable attribute corresponding to the first triggerable control, wherein the first triggerable control is any triggerable control of the at least one triggerable control;

generating an editing instruction according to the data for editing in response to data for editing inputted in the control editing interface; and performing an editing on the attribute of the first triggerable control according to the editing instruction, wherein the controlling the display interface to display the control editing interface corresponding to the first triggerable control triggered in response to the triggering on the first triggerable control in the screenshot interface of the current display content of the first application software comprises:

acquiring the screenshot interface of the current display content of the first application software, and sending an instruction, wherein the instruction is configured to instruct a preset software development kit to acquire information corresponding to all interactive controls on the screenshot interface according to the screenshot.

18. The non-transitory computer-readable storage medium of claim 17, before displaying the screenshot interface of the current display content of the first application software to be analyzed in the preset first display area and before displaying the at least one triggerable control displayed in the screenshot interface, further comprising:

acquiring a first code of the first application software, in response to an analysis instruction for the first application software to be analyzed.

19. The non-transitory computer-readable storage medium of claim 17, wherein, displaying the screenshot interface of the current display content of the first application software to be analyzed in the preset first display area, comprises:

acquiring the interactive interface of the current display content of the first application software and a location information of the first control on the interactive interface, in response to a triggering on a preset data processing control; and displaying the screenshot interface of the current display content of the first application software to be analyzed in the preset first display area and displaying the at least one triggerable control in the screenshot interface according to the interactive interface and the location information of the first control.

20. The non-transitory computer-readable storage medium according to claim 17, wherein, performing the editing for the attribute of the first triggerable control according to the editing instruction, comprises:

sending the editing instruction to a preset Software Development Kit (SDK) whereby the SDK calls a preset editing method and performs the editing for the attribute of the first triggerable control according to the data for editing.

* * * * *